Figure 1:
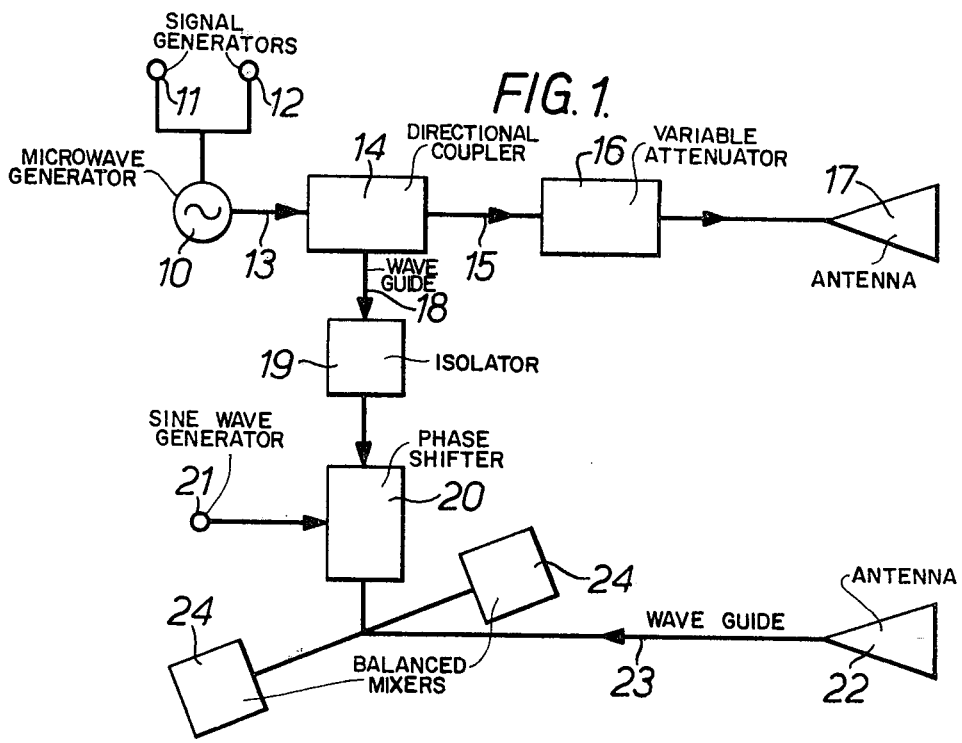

United States Patent [19]

Bosher et al.

[11] 4,044,354
[45] Aug. 23, 1977

[54] DISTANCE MEASUREMENT USING MICROWAVES

[75] Inventors: David Robert Bosher, Hayes; John Folkard, Waltham Cross, both of England

[73] Assignee: British Steel Corporation, London, England

[21] Appl. No.: 338,619

[22] Filed: Mar. 6, 1973

[30] Foreign Application Priority Data

Mar. 15, 1972 United Kingdom .............. 12115/72

[51] Int. Cl.² .............................................. G01S 9/28
[52] U.S. Cl. ...................................................... 343/14
[58] Field of Search .......................................... 343/14

[56] References Cited

U.S. PATENT DOCUMENTS

| | | | |
|---|---|---|---|
| 3,068,471 | 12/1962 | Erst | 343/14 |
| 3,112,481 | 11/1963 | Goldberg | 343/14 |
| 3,167,766 | 1/1965 | Norris, Jr. | 343/14 |
| 3,197,773 | 7/1965 | Black et al. | 343/14 X |
| 3,403,398 | 9/1968 | Engholm et al. | 343/14 |
| 3,680,085 | 7/1972 | Signore | 343/14 |

Primary Examiner—Malcolm F. Hubler
Attorney, Agent, or Firm—Bacon & Thomas

[57] ABSTRACT

A distance measuring system, particularly suitable for targets which are moving slowly relative to a fixed reference point, such as the upper surface of the burden in a blast furnace. A doubly modulated microwave beam is directed at the target, and the reflected beam is mixed with part of the original beam, which part has its phase varied sinusoidally at a frequency lower than the modulating frequencies. The difference frequency detected between the phase-varied signal and the reflected signal is directly proportional to the distance to the target.

10 Claims, 6 Drawing Figures

DISTANCE MEASUREMENT USING MICROWAVES

This invention relates to the measurement of distances using frequency modulated microwaves.

Standard frequency modulation systems have been used for many years for distance measurement. The technique uses a single modulation imposed on a carrier wave. This wave is then transmitted from an antenna directed at the object whose distance away is to be measured, and the reflected wave from the object is received back a short interval of time after its transmission. When the transmitted and received signals are mixed together, a difference frequency (or beat frequency) is detectable whose frequency is proportional to the distance of the object.

The repetitative modulation which is necessary in practice gives rise to a problem associated with the reversal of the modulation, which results in what is termed "fixed error". This fixed error is a characteristic of single frequency modulated systems and is independent of the distance measured. The error is inversely proportional to the frequency sweep employed; for example, if the frequency sweep is 100 MHz, the error in the distance measurement would be ± 75 cms.

Where large distances are being measured, the fixed error may not be important. However, where relatively short distances are required to be measured accurately, the fixed error, being a relatively large percentage of the distance, may introduce an unacceptable degree of innacuracy into the system.

In an improved form of distance measurement, two modulations of different frequencies are applied to the carrier wave. By this means the fixed error can be removed, and greater accuracy of measurement obtained.

We have found, however, that errors also occur with double modulation systems, when such systems are used to measure the distance of fixed objects or objects which are only moving very slowly relative to a fixed antenna. This error is generally not as large as the fixed error referred to previously, and is believed to be due to a phase distortion effect. When single modulation systems are used, the fixed error will mask this further error, and with double modulation, the error only appears at relatively low rates of separation of the antenna and the object.

In measuring, for example, the level of the burden in a blast furnace, the antenna will be directed downwards onto the burden from a distance between approximately 1 to 5 meters. The level of the burden will move slowly downwards, and then, at intervals when a further charge is added from the top of the furnace, rise sharply to a previous level. We have found that the errors occuring using a double modulation system to measure the level of the burden in its slowly moving state can be as large as ± 180 mm.

The object of the invention is to minimise the error in distance measurement which is believed to be due to phase distortion effects.

According to one aspect of the present invention a method is provided for determining the distance from an object including, generating a micro-wave frequency carrier wave, simultaneously modulating the carrier wave at two different frequencies to provide a modulated signal, directing a first portion of the modulated signal towards the object and receiving a reflected signal from the object, directing a second portion of the modulated signal to form a reference signal, cyclically varying the phase of one portion of the modulated signal, mixing the reflected signal with the reference signal, and detecting the difference frequency between the reflected signal and the reference signal.

According to a further aspect of the present invention an apparatus is provided for determining the distance from an object includng a generator for generating a microwave frequency carrier wave, means for simultaneously modulating the carrier wave at two different frequencies to provide a modulated signal, means for directing a first portion of the modulated signal towards the object, means for directing a second portion of the modulated signal to form a reference signal, means for varying the phase of one portion of the modulated signal, a mixer for mixing the reflected signal with the reference signal, and a detector for detecting the difference frequency between the reflected signal and the reference signal.

The phase variation is preferably applied to the second portion of the modulated signal. The phase may be continuously varied sinusoidally, or it may be varied by switching the phase through 180° at regular intervals. Preferably the frequency at which the phase is varied is lower than the modulating frequencies.

The carrier wave may be modulated by waves of differing shape. One of the waves may be triangular in shape.

The first portion of the modulated signal may be attenuated before being directed towards the object. The second portion of the modulated signal may be passed through an isolator.

The object may form part of the upper surface of a particulate bed of material, such as the burden in a blast furnace. The particulate bed may be moving.

The method may include the determining of the distance from a reference point, the difference between the distance from the object and the distance from the reference point producing a measure of the thickness of the object.

Figure 2:
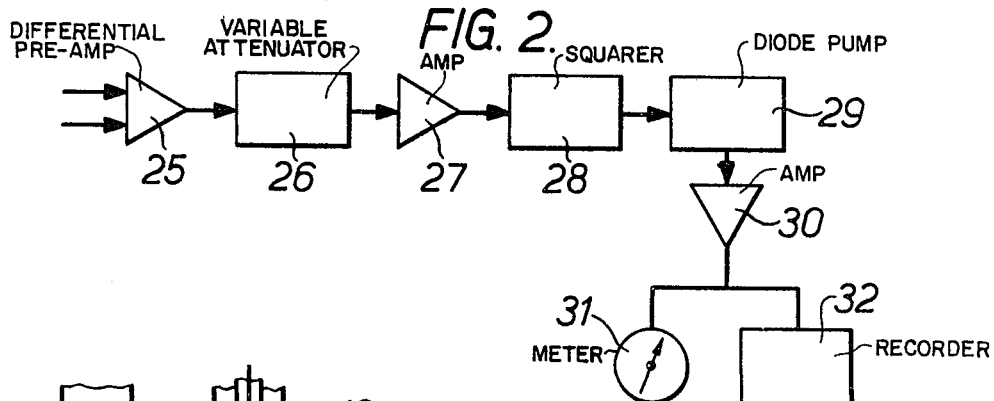
Figure 3:
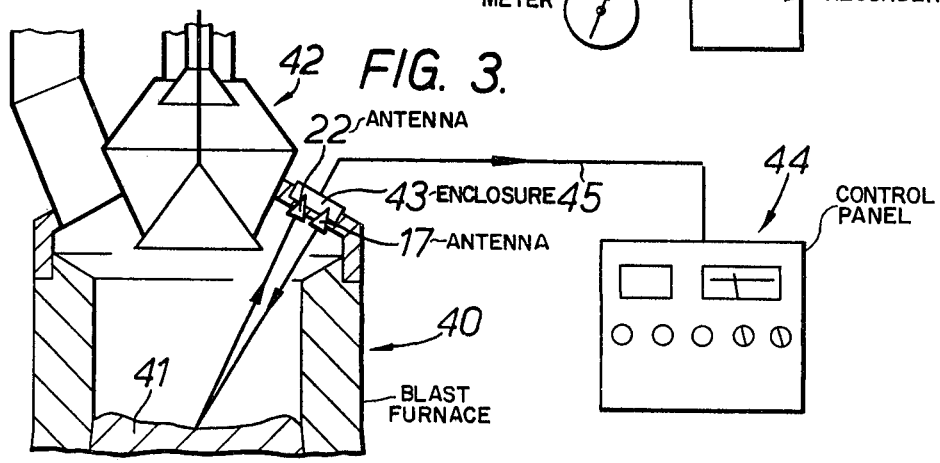
Figure 4A:
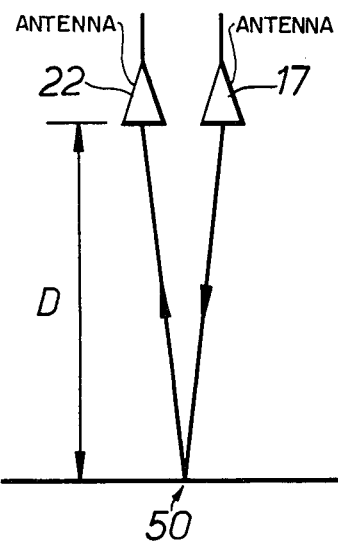
Figure 4B:
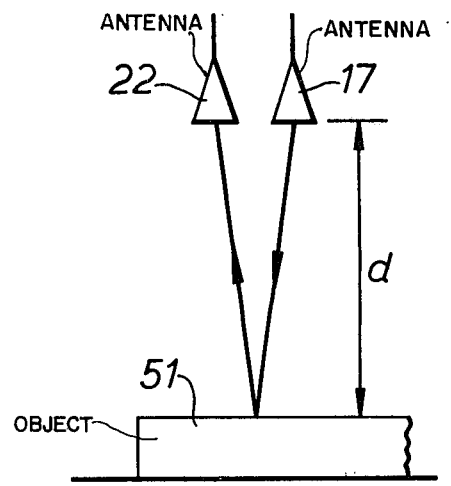
Figure 5:
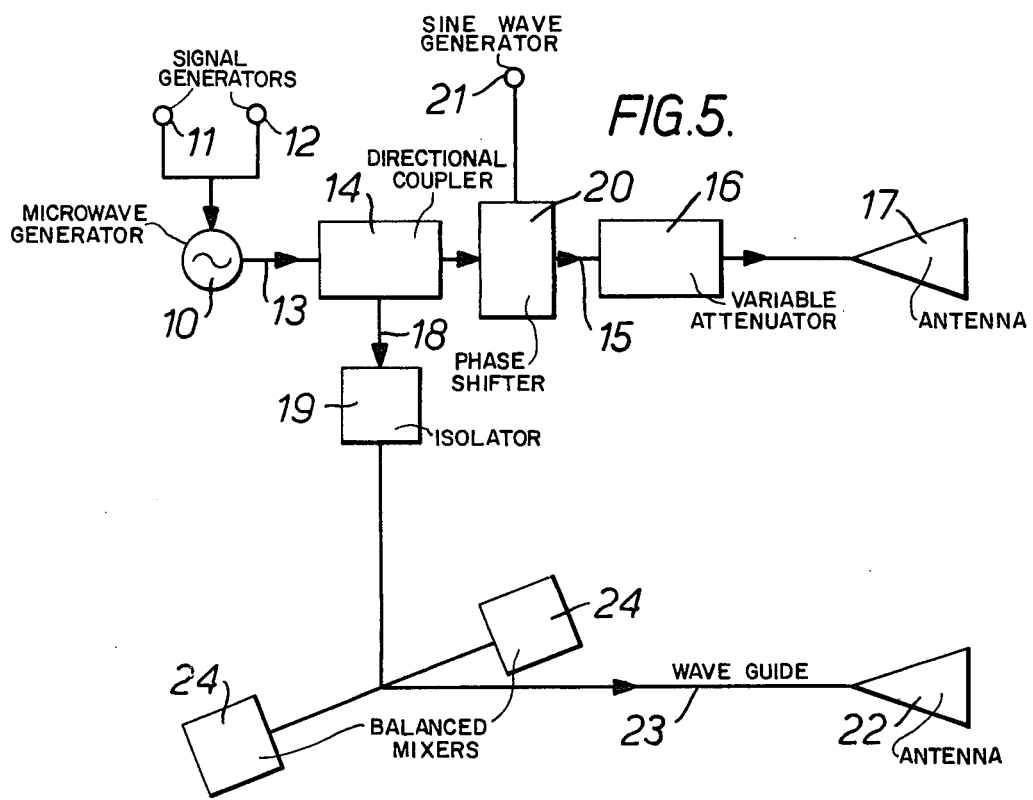

FIG. 1 shows, in schematic form, one example of an apparatus according to the invention, FIG. 2 shows, in schematic form, one example of an apparatus for processing a signal produced by the apparatus of FIG. 1, FIG. 3 shows schematically one example of the use of the apparatus of FIGS. 1 and 2 in a blast-furnace, and FIGS. 4A and 4B show schematically an example of a technique to measure the thickmess of an object using the apparatus of FIGS. 1 and 2, and FIG. 5 shows, in schematic form, a further example of an apparatus according to the invention.

The apparatus of FIG. 1 includes a first microwave generator 10 which generates a microwave frequency carrier wave. The carrier wave is simultaneously modulated by a 500 Hz triangular wave generated by a first signal generator 11 and a 300 Hz parabolic wave generated by a second signal generator 12. The resulting modulated signal is passed along a wave guide 13 to a directional coupler 14.

The directional coupler 14 divides the modulated signal into two portions, the first of which passes along waveguide 15 through a variable attenuator 16 to a transmitting antenna 17. The transmitting antenna directs the first portion of the modulated signal towards an object (see FIG. 3).

The second portion of the modulated signal passes along a further wave-guide 18, through an isolator 19 which prevents any signal from returning to the microwave generator 10, to an electrically-operated phase shifter 20. The phase shifter 20 is operated at a frequency of 10 Hz generated by a sine wave generator 21. This results in a continuous sinusoidal variation of the phase of the second portion of the modulated signal to form a reference signal.

A receiving antenna 22, closely adjacent the transmitting antenna 17, receives a microwave signal which has been directed towards an object by antenna 17 and has been reflected by the object. This reflected signal is passed along wave-guide 23 to a balanced mixer 24 which includes two detecting diodes.

The reference signal produced by the operation of the phase shifter 20 on the second portion of the modulated signal is also fed to the balanced mixer 24. The reference signal is mixed with the reflected signal in the balanced mixer 24, and the difference frequency between the reflected signal and the reference signal is detected by the diodes.

This difference frequency, which is proportional to the distance from the object, is fed to a differential preamplifier 25, (see FIG. 2) which produces an amplified signal. The amplified signal is passed along a coaxial cable, through an adjustable attenuator 26, to an amplifier 27. The adjustable attenuator 26 is used to initially set the signal level according to the strength of the reflected signal. The amplifier 27 is limited in its frequency response according to the required measuring range of the apparatus. For example, if the range over which measurement of the distance from the object is required is from 1m to 10m, the frequency response of the amplifier would be very poor outside the range, say from 4 to 7KHz. This device reduces the noise and possible errors which may occur due to multiple reflections of the microwaves from the object.

The amplified signal from amplifier 27 is then squared in square 28 and passed through a diode pump 29 to a direct current amplifier 30 which produced an output proportional to the difference frequency between the reflected signal and the reference signal which in turn is proportional to the distance from the object. The output from the direct current amplifier 30 is fed to an indicating meter 31 or a chart recorder 32 as required. The meter 31 and chart recorder 32 are calibrated to provide a reading of the distance from the object.

FIG. 3 shows schematically the upper part of an iron-making blast furnace 40 with the transmitting and receiving antennae, 17 and 22 respectively, installed so that they are directed towards the furnace contents or burden 41. In this region of the blast-furnace, the furnace contents 41 form a particulate bed of coke, sinter and fluxes. The object forms part of the upper surface of the bed and microwaves directed from the transmitting antenna 17 towards the upper surface are in part reflected towards the receiving antenna 22, closely adjacent the transmitting antenna 17. In general the furnace contents 41 move slowly downwards, the furnace being recharged at intervals from a charging mechanism 42.

Signal generating and processing equipment of the type shown in FIG. 1 is installed in an enclosure 43 close to the microwave antennae 17 and 22. The differential preamplifier 25 of FIG. 2 is also in the enclosure 43 and the remainder of the signal processing equipment of the type shown in FIG. 2 is contained in a control panel 44 at the base of the furnace 40, and is connected to the differential preamplifier 25 by a length of coaxial cable 45. The distance away of the upper surface of the furnace contents 41 can then be displayed or recorded on the control panel 44 typically of the order of eighty meters away from the microwave antennae 17 and 22.

As shown schematically in FIGS. 4A and 4B, the apparatus of FIGS. 1 and 2 can be used to determine the thickness of an object. The microwave antennae 17 and 22 are directed towards a reference point 50 and the distance D of the reference point 50 from the antennae 17 and 22 is determined by the previously described means. An object 51 whose thickness is to be measured is then placed between the antennae 17 and 22 and the reference point 50 so that its far surface is adjacent reference point 50. The distance $d$ between the near surface of the object 51 and the antennae 17 and 22 is then determined. The difference between the distance D and the distance d is then a measure of the thickness of the object 51. It will be appreciated that this technique can only be used for objects which are not transparent to microwaves.

The elements of FIG. 5 are identical to those of FIG. 1, but the phase shifter 20 is positioned in the waveguide 15 prior to the variable attenuator 16. The phase shifter 20 is operated at a frequency of 10Hz generated by the sine wave generator 21. Thus the phase of the first portion of the modulated signal which is to be transmitted is varied, instead of the second portion as shown in the embodiment of FIG. 1. The signal produced by the apparatus of FIG. 5 may be processed by the signal processing apparatus of FIG. 2.

We claim:

1. A method for determining the distance from an object including, generating a micro-wave frequency carrier wave, simultaneously modulating the carrier wave at two different frequencies to provide a modulated signal, directing a first portion of the modulated signal towards the object and receiving a reflected signal from the object directing a second portion of the modulated signal to form a reference signal non-linearly, cyclically varying the phase of one portion of the modulated signal, mixing the reflected signal with the reference signal, and detecting the difference frequency between the reflected signal and the reference signal, said difference frequency being proportional to the distance to be determined.

2. A method according to claim 1 in which the phase variation is applied to the second portion of the modulated signal.

3. A method according to claim 1 in which the phase is continuously varied sinusoidally.

4. A method according to claim 1 in which the phase is varied by switching the phase through 180° at regular intervals.

5. A method according to claim 1 in which the frequency at which the phase is varied is lower than the modulating frequencies.

6. A method according to claim 1 in which one of the waves which modulates the carrier wave is triangular in shape.

7. A method according to claim 1 in which the first portion of the modulated signal is attenuated before being directed towards the object.

8. A method according to claim 1 in which the object forms part of the upper surface of a particulate bed of material.

9. A method according to claim 8 in which the particulate bed of material forms the burden in a blast furnace.

10. A method according to claim 1 including the determination of the distance of the object from a reference point, the difference between the distance from the object and the distance from the reference point producing a measuring of the thickness of the object.

* * * * *